Patented July 16, 1935

2,008,651

UNITED STATES PATENT OFFICE 2,008,651

METHOD OF COATING FLAKES

Robert E. Zinn, Chicago Heights, Ill., assignor to Victor Chemical Works, Chicago, Ill., a corporation of Illinois No Drawing. Original application September 5, 1933, Serial No. 688,268, now Patent 1,979,926, dated November 6, 1934. Divided and this application March 1, 1934, Serial No. 713,615

11 Claims. (Cl. 23—243)

This invention relates to a method of coating flakes, more particularly to a method of coating a water softener consisting of thin flakes of alkali metal pyrophosphates or metaphosphates, with adhering alkali metal salts.

In my co-pending application, Serial No. 688,267, filed September 5, 1933, is described a process of producing thin flakes of alkali metal pyro or metaphosphates or mixtures thereof, which consists essentially in pouring such substances in molten form between rapidly rotating rolls while partially congealing said substances, discharging the material in ribbon-like partially congealed form from the rolls, and completing congelation thereof.

Flakes so produced may be used as water softeners, and produce salts of calcium magnesium, etc., which are sufficiently soluble so as to produce no precipitate in the treated water. It is often desirable, however, to add other alkali metal salts to meta or pyrophosphates or mixtures thereof. For instance, with certain types of hard water, the pyro or metaphosphates will not reduce the hardness to zero by the soap test, but with an added alkali metal salt such as trisodium ortho phosphate, or sodium carbonate, the hardness can be readily reduced to zero without any precipitation. It has now been discovered that the flakes of phosphatic material so prepared may readily be incorporated with other alkali metal salts by powdering such salts and mixing them with the flakes. The flakes are then agitated and are sprayed with a fine mist of water in a definite amount so that no substantial solution of the flakes occurs. This is preferably carried out by using a normally hydrated alkali metal salt in anhydrous or partially anhydrous condition, and using sufficient moisture to cause adherence of the crystals, but not substantially more than is necessary to permit the salt to regain its normal hydrated form. Preferably only enough is used to partially rehydrate the salt, and the range of 40-80% of the amount required for this purpose is generally preferred. In practice it is preferred to use as near to 40% of the water required to rehydrate the salt as possible.

Some of the water which is sprayed upon the flakes is not taken up by the rehydrated salt, but adheres to the flake itself. It is therefore preferred to dry the flakes after the spraying, and this may be done by gentle drying with warm air.

As an example of this process, thin flakes of alkali pyro or metaphosphates or mixtures thereof are produced having a glossy appearance, but spotted with very small crystals of the adhering salt. The salt has the appearance of being fused into the surface of the flakes.

The percentage of alkali metal salt added to the pyro or metaphosphate may be adjusted as desired, up to 50% of the resulting flake, without causing any hard water precipitate when used as a water softener in hard water.

As an example of the invention, sodium metaphosphate flakes were prepared in accordance with the process of my co-pending application, Serial No. 688,267, and were placed in a mixer similar to an ordinary concrete mixer, the desired amount of trisodium phosphate monohydrate in powdered form was dusted into the mixer with the metaphosphate flakes, and the two were thoroughly mixed. After the mixing was complete, a fine spray of water was sprayed into the mixer. The trisodium phosphate became affixed to the flakes and took up the water as water of hydration without any appreciable solution of the flakes. In a specific instance water sufficient to produce about 8 or 9 molecules of water of crystallization was used, as against 12 required to completely rehydrate.

It is obvious that other means may be used for producing flakes of this character or to produce the permanent adherence of the added salt. For example, the flakes may be first sprayed with moisture and then dusted with a partially or wholly anhydrous salt. Likewise, a solution of the added salt dissolved in its water of crystallization may be sprayed onto the surface of the flakes and crystallized thereon when cooled. It is also possible to produce the flakes by using more than the amount of water described, but it is preferred not to do so inasmuch as the flakes may be considerably damaged. Flakes produced in this manner will not cake, are almost instantly soluble in water, are readily handled for domestic and commercial use, and the composition of the material remains uniform throughout, since there is no segregation as would be the case between a powder and a flake. The trisodium phosphate is also low in phosphate content, yet it contributes as much softening effect so that there is a saving in cost.

Alkali metal hydroxides may also be used, but it is preferred not to produce a water softener in flake form in this case, because of the deliquescent character of the hydroxides. By "dehydrated" as used in the claims of this application, is meant a substance which has been either partially or wholly dehydrated.

As set forth in my co-pending application Serial No. 688,267, filed September 5, 1933, the flakes when prepared in accordance with the process therein described have a thickness of the order of 0.001 of an inch. This may be varied within considerable limits, but in general, the flakes are less than 0.01 of an inch in thickness.

This application is a division of my co-pending application Serial No. 688,268, filed September 5, 1933, which is now United States Patent, No. 1,979,926.

The foregoing detailed description has been given for clearness of understanding only, and no unnecessary limitations should be understood therefrom, but the appended claims should be construed as broadly as permissible, in view of the prior art.

I claim:

1. The method of spot coating a flake, which comprises preparing a solution of dehydrated crystalline substance in a quantity of water not substantially in excess of that required to rehydrate said substance and contacting said solution with said flake, and maintaining said contact until said water has been substantially taken up by the substance as water of crystallization, the amount of crystalline substance being sufficient only to form a spot coating thereon.

2. The method of producing a flake of amorphous material having thereon a spot coating of a soluble crystalline material which comprises admixing the flake, said soluble material and a minor quantity of water, whereby said soluble material is at least partially dissolved and adheres to said flake, and removing excess moisture, the amount of crystalline substance being sufficient only to form a spot coating thereon.

3. The method as set forth in claim 2, in which said soluble material is a dehydrated crystalline material, and water is present in not to exceed the amount required to rehydrate said material.

4. The method of spot coating a flake of a material of the class consisting of alkali meta and pyrophosphates or mixtures thereof with a salt of the class consisting of alkali metal carbonates and orthophosphates, which comprises admixing said salt in powdered and dehydrated form with said flakes, adding water in an amount not substantially more than sufficient to rehydrate said salt, and contacting said flakes, salt and water until said water has been substantially taken up by said salt as water of crystallization, the amount of said salt being sufficient only to form a spot coating on the flake.

5. The method as set forth in claim 4, in which the amount of water is from 40–80% of that required to rehydrate the salt.

6. The method as set forth in claim 4, in which the amount of water is approximately 40% of that required to rehydrate the salt.

7. A method as set forth in claim 4, in which the coated flakes are subsequently dried to remove moisture not taken up by said salt.

8. The method of spot coating a flake of a material of the class consisting of alkali meta and pyrophosphates or mixtures thereof with a salt of the class consisting of alkali metal carbonates and orthophosphates, which comprises preparing a solution of said salt in dehydrated form with water substantially sufficient to rehydrate said salt, and spraying said flakes with said solution, the amount of said salt being sufficient only to form a spot coating on the flake.

9. The method of spot coating a flake of a material of the class consisting of alkali meta and pyrophosphates or mixtures thereof with a salt of the class consisting of alkali metal carbonates and orthophosphates, which comprises moistening said flakes with water and immediately dusting said flakes with said salt in dehydrated form, the amount of water being not substantially more than sufficient to rehydrate said salt, the amount of said salt being sufficient only to form a spot coating on the flake.

10. The method as set forth in claim 4, in which said flake is composed of sodium metaphosphate, and said salt is trisodium phosphate.

11. The method as set forth in claim 4, in which said flake is composed of sodium metaphosphate, and said salt is sodium carbonate.

ROBERT E. ZINN.